United States Patent [19]
Flaugher

[11] Patent Number: 5,990,575
[45] Date of Patent: Nov. 23, 1999

[54] AUXILIARY POWER SOURCE CONTROL SYSTEMS AND METHODS

[76] Inventor: David J. Flaugher, 4341 Blossom Hill Ct., Raleigh, N.C. 27613

[21] Appl. No.: 09/120,971

[22] Filed: Jul. 22, 1998

Related U.S. Application Data

[60] Provisional application No. 60/053,397, Jul. 22, 1997.

[51] Int. Cl.$^6$ .................................................. H02J 1/10
[52] U.S. Cl. .................................................. 307/23; 307/29
[58] Field of Search ................................... 307/64, 66, 23, 307/29, 40, 38, 18, 65, 80, 81, 85–87

[56] References Cited

U.S. PATENT DOCUMENTS

| | | | |
|---|---|---|---|
| 4,593,349 | 6/1986 | Chase et al. | 307/29 |
| 4,663,539 | 5/1987 | Sharp et al. | 307/64 |
| 5,381,554 | 1/1995 | Langer | 395/750 |
| 5,559,376 | 9/1996 | Tachikawa | 307/18 |
| 5,646,462 | 7/1997 | Cortes et al. | 307/127 |

*Primary Examiner*—Richard T. Elms
*Attorney, Agent, or Firm*—Alston & Bird LLP

[57] ABSTRACT

A control system and method for acquiring and providing backup power to a plurality of distributive communication devices using a single DC APS system is described. The control system comprises a controller that senses the DC bus voltage of each distributive communication device connected to the controller, and controls the output of an auxiliary power source such as a DC generator, fuel cells, or any other suitable DC backup power source that is connected to the controller. The controller further comprises one or more switches which selectively connect each of the distributive communication devices to the APS in manner that prevents power surge currents. The controller further comprises a blocking diode to prevent ground loops between the co-located cabinets, and diodes to isolate each of the co-located cabinets power and ground.

7 Claims, 6 Drawing Sheets

_ _ 1

AUXILIARY POWER SOURCE CONTROL SYSTEMS AND METHODS

CROSS-REFERENCE TO RELATED APPLICATIONS

This application claims benefit of co-pending U.S. Provisional Application No. 60/053,397, entitled "Auxiliary Power Source Control Systems and Methods", filed Jul. 22, 1997.

FIELD OF THE INVENTION

The present invention generally relates to auxiliary power systems, and more particularly, to the control of auxiliary power sources for the distribution of backup power to distributive communication devices.

BACKGROUND OF THE INVENTION

As a result of the information revolution, communication systems are rapidly evolving to the extent that their constantly changing state has become the norm. Vast distribution networks have been deployed by the telecommunications industry and the cable television industry to provide point-to-point and point-to-multipoint communication interconnections with subscribers. As consumer-oriented multimedia services such as the Internet and high resolution television are being deployed, these distributive communications networks are configured to be more robust and dependable, especially in rural areas where dependable service has historically been less critical.

Integral to most of the network implementations which are well known in the industry is the use of distributive communication devices such as, but not limited to the following: digital loop carriers, pairgains, concentrators, multiplexers, remotely located cabinets, outside plant modules, repeaters, nodes, base stations, optical network units, sonets, and subscriber loop carriers. For purposes of this disclosure, a distributive communication device can be generally described as any active or passive component in a communication network that is remotely located with respect to a head end/or central switch device, and which requires power for the operation thereof. The following discussion will be directed primarily to the concentrator cabinets used by the telecommunications industry to provide POTS (plain old telephone system) services.

In the telecommunications industry, concentrator cabinets are utilized to perform multiplexing and de-multiplexing functions. These cabinets are provided with alternating current (AC) power which is converted to direct current (DC) power for use by the electronics enclosed in the cabinets. For robustness, these cabinets are provided with backup power sources in case of an AC power failure. The backup power sources usually comprise float charged DC batteries that typically have a limited backup time of between 1–10 hours. For remote locations where longer backup times are desirable, electromechanical long-term DC backup systems such as DC generators, fuel cells, or kinetic energy storage devices are provided. These electromechanical devices are typically referred to in the industry as auxiliary power sources (APS) systems. These DC APS systems are typically permanently installed at the concentration cabinet. Because of network design and expansion, a plurality of concentrator cabinets may be installed at a single site, each having its own dedicated DC APS system. However, this redundancy of DC APS systems for co-located concentrator cabinets is unnecessary and wasteful.

Accordingly, there is an unaddressed need in the industry for a system and method for efficiently providing power to co-located installed concentrator cabinets during periods of AC power failure in a cost effective manner.

SUMMARY OF THE INVENTION

The present invention, as described below, overcomes the deficiencies in the industry as described above and as is well known to those skilled in the art. Particularly, the present invention provides control systems and methods for acquiring and providing backup power to a plurality of distributive communication devices using a single DC APS system. The control system of the present invention comprises a controller that senses the DC bus voltage of each distributive communication device connected to the controller, and controls the output of an auxiliary power source such as a DC generator, fuel cells, or any other suitable DC backup power source that is connected to the controller. The controller further comprises one or more switches which selectively connect each of the distributive communication devices to the APS in manner that prevents power surge currents. The controller further comprises a means to prevent ground loops between the co-located cabinets, and means to isolate each of the co-located cabinets power and ground.

In accordance with an aspect of the present invention, a method for attaching any auxiliary backup DC power supply or source used to provide power during an AC or primary power source outage to co-located telecom electronic cabinets, huts, vaults, or etc. is provided. Such method does not directly connect each separate telecommunication electronic cabinet=s, hut=s, vault=s, or etc ground or power busses together. Such method utilizes blocking diodes and/or contactors or relays to isolate the co-located telecommunications electronic cabinets, huts, vaults, or etc.

In accordance with another aspect of the present invention, a method for attaching any auxiliary backup DC power supply or source used to provide power during an AC or primary power source outage to co-located telecommunication electronic cabinets, huts, vaults, or etc. prevents surge currents between the co-located telecom electronic cabinets, huts, vaults, or etc. The surge currents are caused by each co-located telecommunication electronic cabinets, huts, vaults, or etc. voltage is slightly different, and a direct connection of approximately zero ohms may create large surge currents until equalized. Such method also prevent surge currents between the auxiliary backup DC power source/supply and each of the co-located telecommunication electronic cabinets, huts, vaults, or etc. due slight mismatched voltages.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference symbols designate corresponding parts throughout the several views.

DETAILED DESCRIPTION OF PREFERRED EMBODIMENTS

The present invention will be described herein with reference to its application in a telecommunication network such as that used to provide plain old telephone system (POTS) service. It is noted, however, that the present invention has application in numerous other communication networks as will be appreciated by those skilled in the art. In the context of a telecommunication network, the distributive communication device is a concentrator cabinet ("cabinet"). The present invention provides for soft switching from the backup battery source of a cabinet to an auxiliary power source (APS) in a manner that prevents undesirable power surges. Thus, a plurality of cabinets can share a single APS that is proximately located with respect to each of the cabinets. Therefore, a relatively low cost auxiliary power source can provide backup power to a plurality of cabinets in a remote or rural area.

Figure 1:
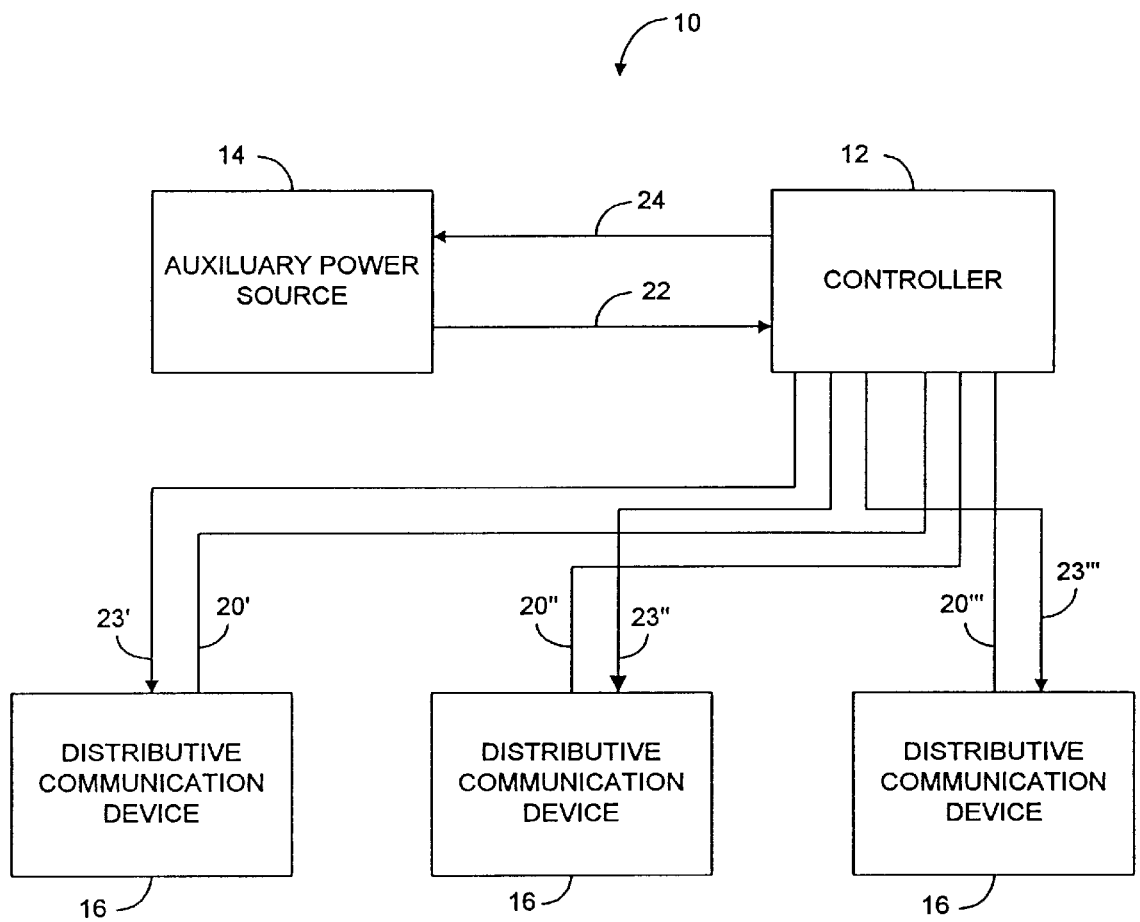
FIG. 1 is a schematic illustration of a backup power control system in accordance with the present invention for providing backup power from an auxiliary power source (APS) to a plurality of distributive communication devices.

With reference to FIG. 1, an auxiliary power control system 10 in accordance with the present invention comprises a controller 12, an APS 14, and a plurality of distributive communication devices 16 (i.e., cabinets), only three of which are illustrated for purposes of brevity. The controller 12 monitors the current flow in the power buses of each of the cabinets 16 via the respective current lines 20', 20", 20'" in order to detect an AC power failure that would cause the battery backup associated with a distributive communicative device to begin to provide power to the electronics thereof If a power failure is detected, the controller 12 actuates and the APS 14, and controls the output voltage of the APS 14 via the control line 24. Once actuated, the controller 12 monitors the power output of the APS 14 on the line 22 which can be selectively connected to one or more of the cabinets over the respective power lines 22', 22", and 22'". The controller 12 actuates and the APS 14 and controls the output voltage of the APS 14 via the control line 24.

Therefore, in accordance with the present invention, the controller 12 is able to control the output voltage of the APS to match the bus voltage of the respective cabinets 16 as each cabinet 16 is sequentially connected to the APS 14. In a preferred embodiment, the controller initially matches the APS output voltage to the lowest cabinet bus voltage, and then connects the APS 14 to the cabinet 16 with the lowest bus voltage so as to ensure a soft (i.e., low current) switch from the battery backup of the cabinet 16 to APS 14. The controller then matches the APS output voltage to the next lowest cabinet bus voltage so that cabinet can be connected to the APS 14. In sequential fashion, the controller 12 continues to connect the cabinet with the next lowest bus voltage until each cabinet experiencing a power failure has been connected to the APS 14. The controller 12 then provides power to each of the cabinets 16 at a voltage that is predetermined by or based on various factors such as the highest temperature backup batteries, pre-set values, or remotely configurable values.

Figure 2:
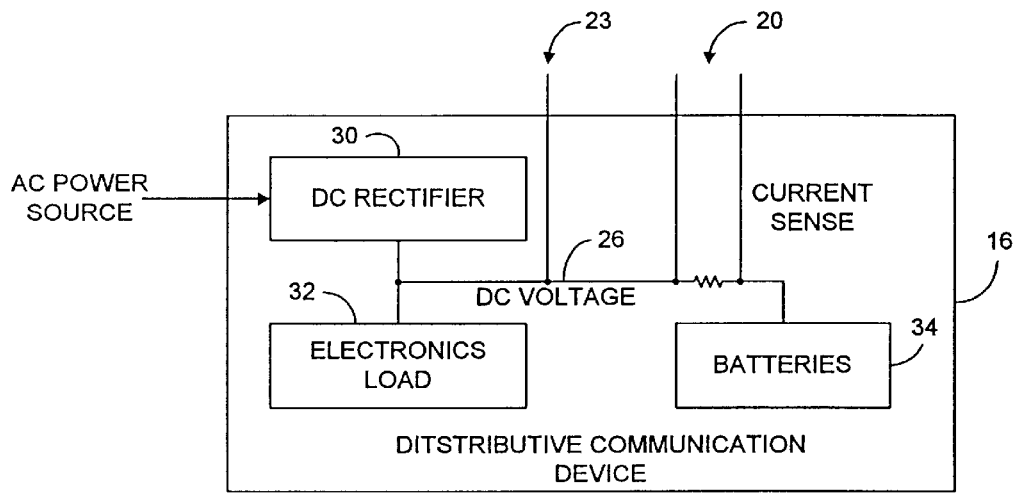
FIG. 2 is a schematic illustration of the distributive communication device of FIG. 1.

With reference now to FIG. 2, an illustrative example of a typical cabinet 16 that is used in a telecommunications network is provided. The cabinet 16 comprises a direct current (DC) rectifier 30 that converts AC power from an external source into DC power which is provided to the electronics load 32 (e.g., a telecommunications switch such as a PBX). In addition, backup batteries 34 are provided as a backup power source, as is well known in the industry. The power line 23 is connected to the bus 26 of the cabinet 16 for conducting power from the APS 14 during AC power failures. The current flow on the bus 26 is monitored by current lines 20', 20", 20'" (identified by reference numeral 20), of the respective distributive communication devices 16.

Figure 3:
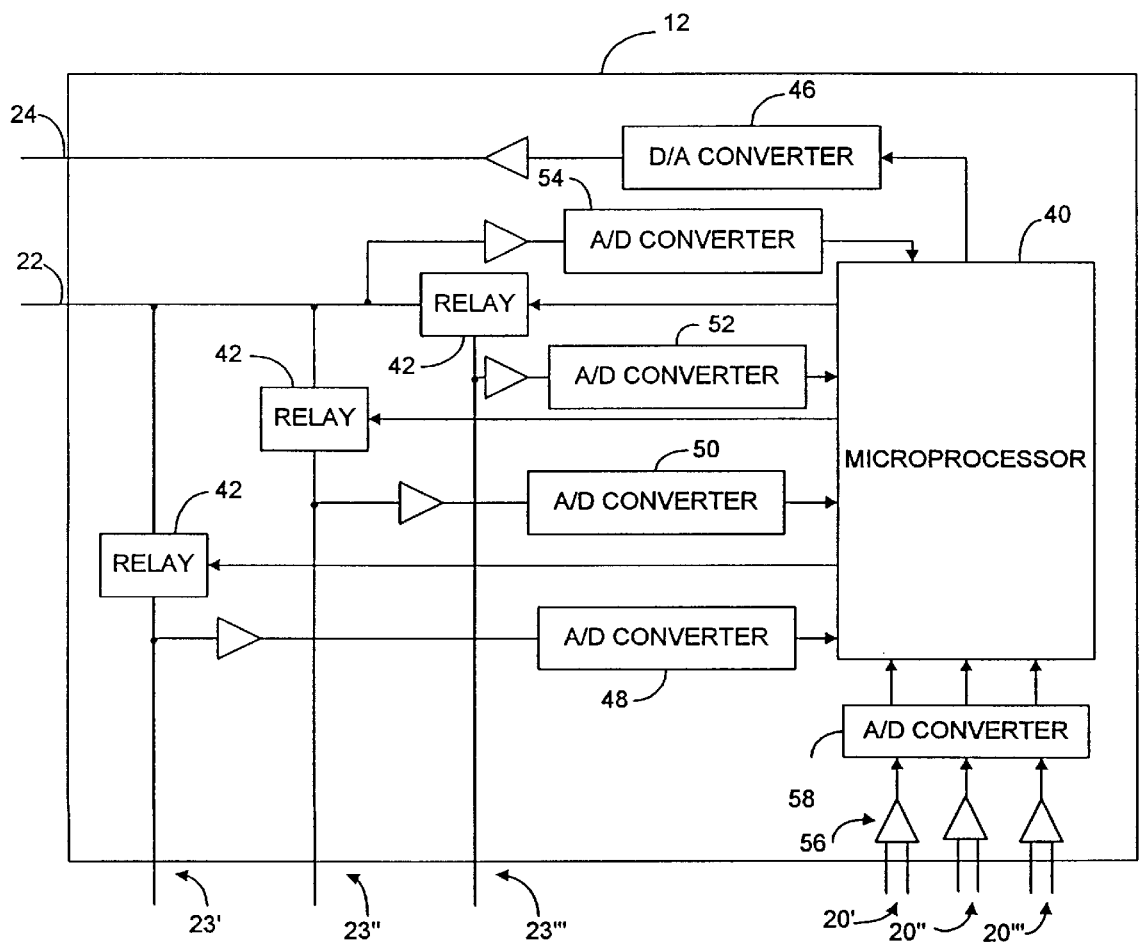
FIG. 3 is a schematic illustration of the controller of FIG. 1 in accordance with the present invention.

With reference to FIG. 3, an illustrative example of an implementation of a controller 12 in accordance with the present invention is provided. The controller 12 includes a microprocessor 40, and a plurality of relays 42 which are respectively associated with lines 23', 23", and 23'". In addition, a plurality of analog-to-digital (A/D) converters 44 and a digital-to-analog (D/A) converter 46 are provided.

The microprocessor 40 includes the control logic for controlling the operation of the present invention, preferably in the form of program code that is stored in a memory associated with the microprocessor such as a flash ROM or an EEPROM. An external communication link (not shown) may be provided to the controller 12 in order to update or modify the control logic of the microprocessor 40, as is commonly known with telemetry devices. The microprocessor 40 controls the operation of the APS 14 via the control line 24 and the D/A converter 46. The output voltage of the APS 14 can be selectively connected to the cabinets 16 by the respective relays 42, the operation of which is controlled by the microprocessor 40. Further, the microprocessor 40 monitors the voltage on the power line 22 via the A/D converter 54. The voltages on the current lines 20', 20", 20'" are measured by the respective op amps 56, the outputs of which are fed to the A/D converter 58. The outputs of the A/D converter 58 are provided to the microprocessor 40.

Figure 4:
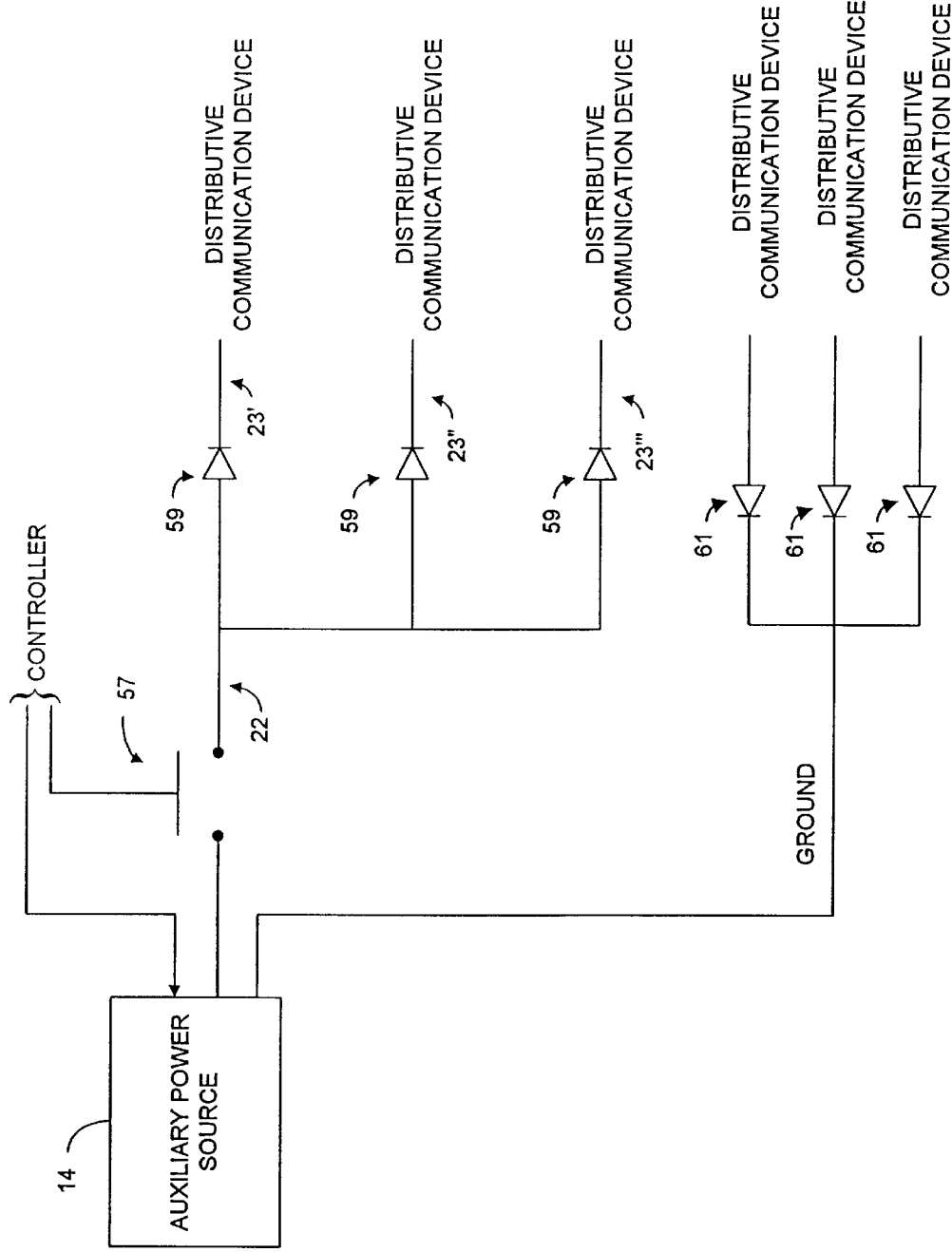
FIG. 4 is a schematic illustration of an alternative configuration for connecting the distributive communication devices to the APS bus in FIG. 3.

In an alternative configuration for connecting the distributive communication devices 16 to the power line 22, the APS 14 provides power to the distributive communication devices 16 via a switch 57 and respective diodes 59, as illustrated in FIG. 4. If an AC power failure occurs at any one of the distributive communication devices 16, or any distributive communications device's DC voltage falls below a preset value (usually 2.16 volts per cell) indicating a rectifier voltage sag or failure, the controller 12 detects the power loss on the respective current lines 20 (FIG. 1) associated with that distributive communication device 16, as discussed above. The controller 12 then activates the APS 14 and brings it to a steady state of operation. Once the bus voltage of the APS 14 has stabilized at or below the lowest bus voltage of the connected distributive communication devices 16, the switch 57 is actuated, thereby closing switch 57. This connects the APS 14 to the distributive communication devices 16 though no power flows to the distributive communication devices 16 until the respective diodes 59 become forward biased. It should be noted that if more than one distributive communication device 16 encounters an AC power failure, as is commonly the case, the controller 12 brings the APS bus voltage on power line 22 up to or just below the lowest bus voltage of the connected distributive communication devices 16.

In addition, blocking diodes 61 can be provided on the respective ground lines interconnecting each of the distributive communication devices 16 to the auxiliary power source 14. The blocking diodes 61 isolate the power and ground, which is desirable for reasons which are well known to those of ordinary skill in the art, including the prevention of undesirable ground currents.

Once the APS 14 bus voltage has stabilized and switch 57 has been closed, the controller 12 incrementally increases the APS bus voltage at an appropriate rate to a final bus voltage or final current value, which is predefined as the operating value of APS 14. The diodes 59 will be reverse biased during the period when the APS bus voltage is less than the respective bus voltages on lines 23', 23", and 23'". Once the APS bus voltage becomes higher than the voltages on respective lines 23', 23", and 23'", then the diodes 59 become forwards biased and are conductive, insuring that no surge currents occur while switching from battery to APS backup power supply. At that point, the APS 14 begins supplying power to the associated distributive communication device 16 for operation thereof and for recharging the associated batteries 34 (FIG. 2). Note that the diodes typically become forward biased when the bus voltage for a distributive communication device 16 drops below the operation voltage of the APS 14 due to the discharge of batteries 34 which are powering the distributive communication device 16 during an AC power outage.

Accordingly, this configuration replaces the relays 42 with the switch 57 and diodes 59. Consequently, this configuration requires fewer components and less complexity in operation since the only control required is the setting of the initial APS start voltage and the actuation of the switch 57. Whereas the previous configuration for connecting the distributive communication devices 16 to the power line provides for connecting the APS 14 and selectively powering only those distributive communication devices that require power due to single phase AC voltage loss or a single distributive communication device's rectifier failure, the configuration illustrated in FIG. 4 provides for the supply of power to any distributive communication device 16 which has a bus voltage below the APS output voltage.

Figure 5:
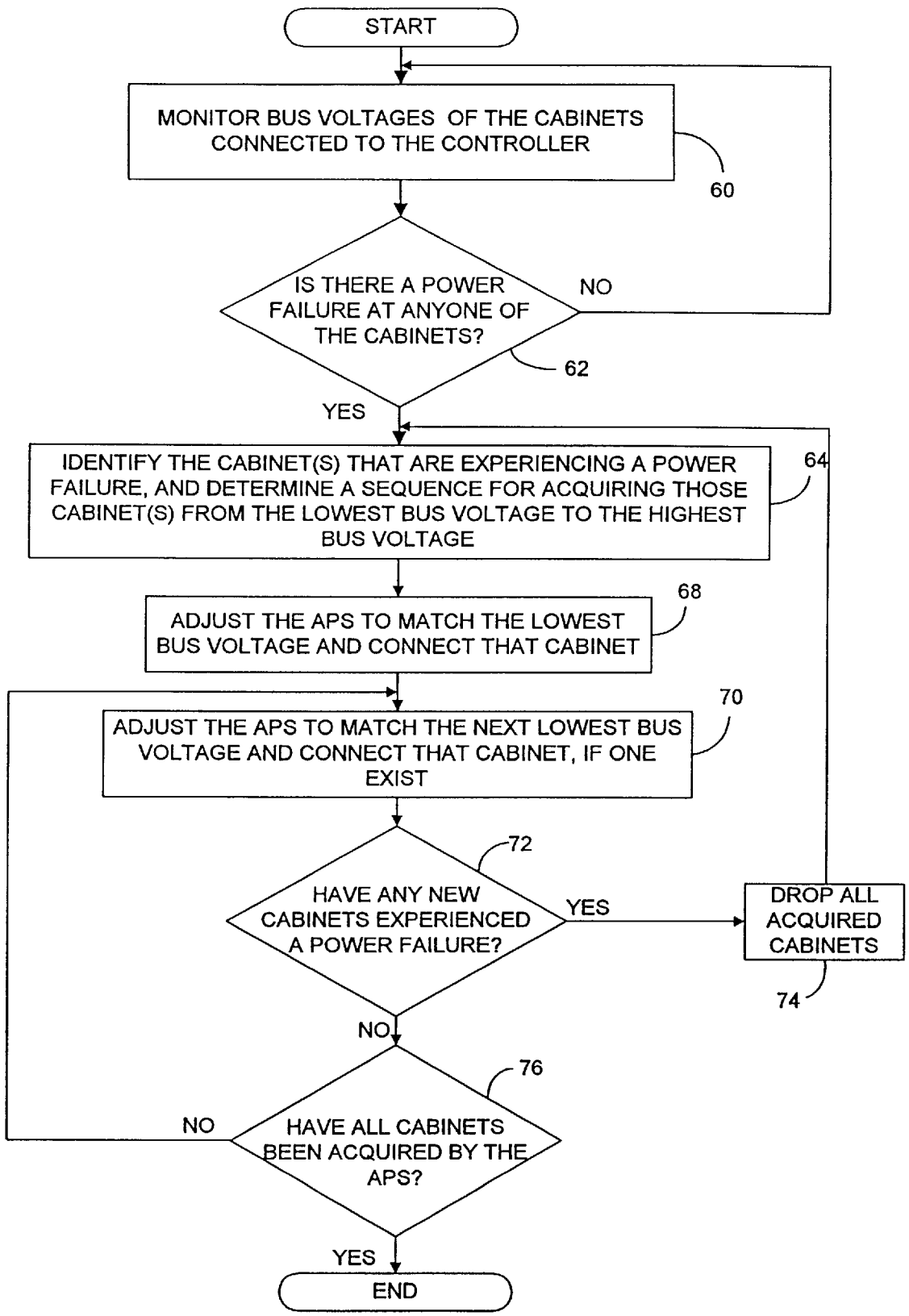
FIG. 5 is a flowchart of the operation of a backup control system in accordance with the present invention.

With reference to FIG. 5, the operation of the auxiliary power control system 10 is described. In operation, the controller 12 monitors the bus voltage of the cabinets 16 that are connected to the controller 12 for an AC power failure, as indicated by block 60. This is identified by a change in polarity of the voltage on current lines 20. Once an AC power failure is detected at block 62, the microprocessor 40 identifies which of the cabinets 16 are experiencing a power failure and in what sequence to acquire those cabinets 16, as indicated at block 64. The sequence is determined in advance because it may take several minutes for the APS 14 to actuate and attain a steady state output voltage. During this time, the backup batteries 34 will be powering the respective cabinets 16, and due to numerous factors such as temperature, state of charge, flow voltage, discharge current, etc., the backup batteries 34 may dissipate power at different rates. By monitoring the rate of dissipation of the bus voltages of the cabinets 16 over a discrete period of time, the appropriate sequence for acquiring the cabinets 16 can be determined. In the preferred embodiment, the cabinets are connected to the APS 14 in order from lowest bus voltage to highest. Thus, the APS 14 is activated upon detection of a power failure and is brought to a state of operation at the lowest bus voltage, as indicated by block 68. Note, the controller 12 controls the operation of the APS 14 via control line 24. Once the output voltage of the APS 14 has stabilized, as detected on power line 22 via the A/D converter 54, the microprocessor 40 closes the relay 42 associated with that cabinet 16, thereby connecting the cabinet 16 to the APS 14 via the associated power line 23.

Because the output voltages of the APS 14 and the bus voltage of the cabinet 16 are substantially equal, the transition from the backup battery 34 to the APS 14 is a soft switch that prevents current surges to the electronics load. The ability to provide a soft switch from the backup batteries to the APS 14 is extremely important because slight variances in the voltages may create power surges into the APS generator or into the backup batteries 34 which may cause damage to the electronics load 32. It is believed that current flow tolerances in the cabinet 16 should not exceed 0.1 amps during a switch from battery backup to the APS 14.

Once the lowest bus voltage of a cabinet 16 is matched and the cabinet 16 is connected to the APS 14, the output voltage of the APS 14 is raised to match the next lowest bus voltage of a cabinet 16 that has experienced an AC power failure, if one exist. Once that bus voltage has been reached, the relay 42 associated with that cabinet 16 is closed, so as to connect the APS 14 to that cabinet 16 via the associated power line 23, as indicated by block 70.

Next, at block 72, it is determined if another cabinet 16 has experienced an AC power failure in the interim. If so, then the cabinets that have been acquired are dropped and the acquisition process of steps 64–70 are repeated so that the cabinet that experienced the power failure after the process began is acquired in accordance with the process described above, as indicated by block 74. It is then determined at block 76 that all the cabinets 16 have been acquired. If they have not, the next lowest bus voltage of a cabinet 16 is matched by the APS 14 so that cabinet 16 can be connected to the APS 14 in a soft switch. Once all the cabinets 16 experiencing a power failure have been acquired, the process ends.

Figure 6A:
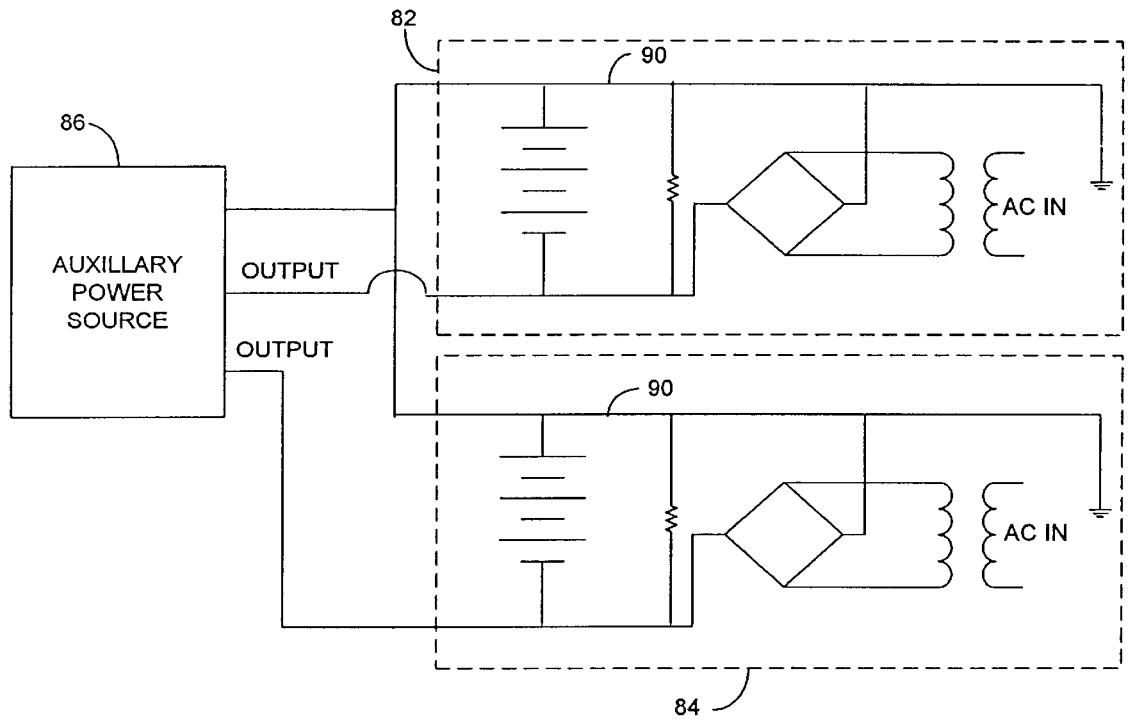
FIGS. 6A and 6B are schematic illustration of a ground loop in a backup power control system in accordance with the present invention.
Figure 6B:
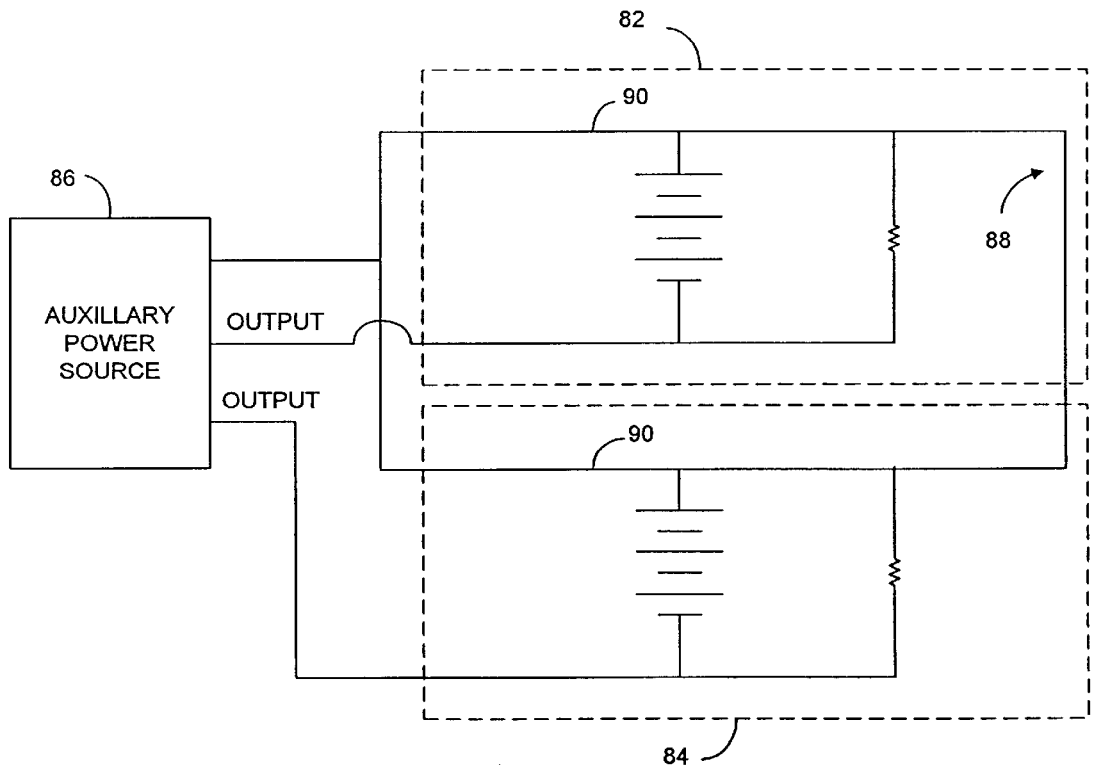

In the backup power control system of the present invention, consideration should be given to the potential problem of ground loops. Particularly, if all the resistances are not balanced, which they seldom are, then current may flow in the ground loop because of the mismatched resistances. This is schematically illustrated in FIGS. 6A and 6B. In FIG. 6A is a exemplary diagram of two distributive communication devices 82, 84 connected to an APS 86 in accordance with the present invention, and FIG. 6B is a more generalized illustration of the circuit of FIG. 6A that schematically shows a ground loop 88. Because each of the ground lines 90 have a discernable resistance that varies according to the respective length and material of the ground line, the different resistances create a voltage difference that results in current flow. As a result, the control circuitry such as controller 12 (not shown for purposes of brevity) is unable to accurately control the operation of the distributive communication devices 82, 84 and the APS 86 due to the additional current flow, as would be recognized by those skilled in the art. In addition, it is well known that ground loop voltage can be a cause of noise in a communications system, and therefore, is undesirable.

Figure 7:
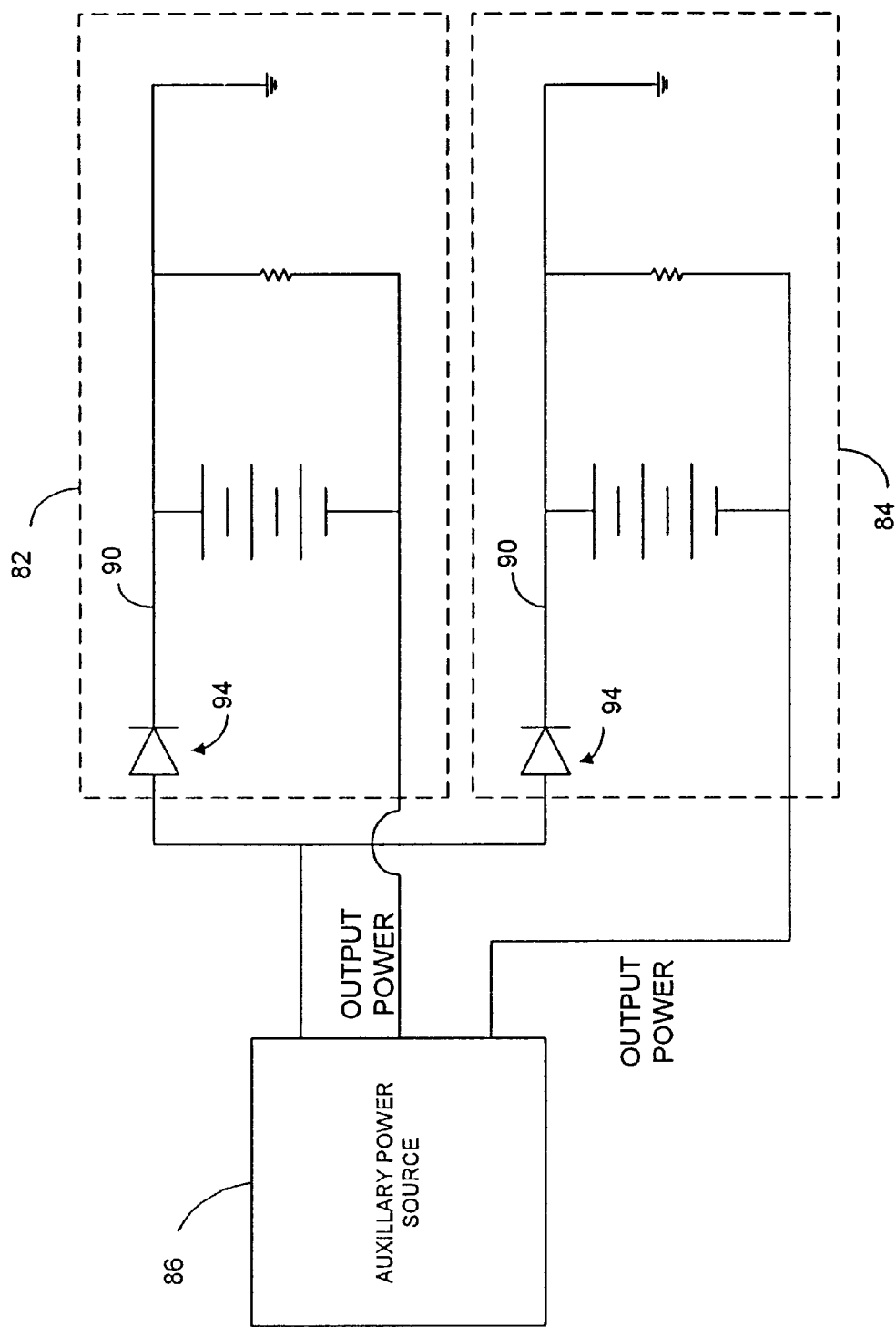
FIG. 7 is a schematic illustration of a backup power control system in accordance with the present invention with blocking diodes to prevent ground loop current and isolate the power busses of co-located cabinets.

Consequently, to overcome the potential problem of ground loop current, a blocking diode 94 can be added to each ground line 90, as shown in FIG. 7. Therefore, each distributive communication device 82, 84 has a blocking diode 94 that substantially prevents the flow of ground loop current. While there is the possibility that the blocking diodes 94 may become forward biased and begin to conduct ground loop current, the voltages on the ground lines 90 would have to be at least approximately 0.7 volts for conventional diodes which is highly unlikely, and with a proper design of the system would be virtually impossible. Thus, the respective grounds for the distributive communication device are essentially isolated from the one another, eliminating problems with ground loop current.

In the drawings and specification, there have been disclosed typical preferred embodiments of the invention and, although specific terms are employed, they are used in a generic and descriptive sense only and not for purposes of limitation, the scope of the invention being set forth in the following claims.

Wherefore, the following is claimed:

1. An auxiliary DC power source control system for distributing backup power from an auxiliary DC power source to a plurality of distributive communications devices operable with DC power, comprising:

switch means that are selectively actuated for independently connecting said auxiliary DC power source to each of said distributive communications devices;

detection means associated with each distributive communications device for detecting a DC bus voltage of each distributive communications devices; and a controller for controlling operation of said switch means based on the DC bus voltages detected by said detection means so that in case of a power failure said distributive communication devices that are experiencing a power failure are sequentially connected to said auxiliary DC power source from a lowest DC bus voltage to a highest DC bus voltage.

2. The system of claim 1, wherein each said switch means comprises a relay associated with each of said distributive communication devices, and that is independently controlled by said controller.

3. The system of claim 1, wherein each said switch means comprises a switch that connects said distributive communication devices to said auxiliary power supply via respective power lines, wherein each said power line includes a circuit diode for independently conducting current to said associated distributive communication device if a voltage of said auxiliary power supply is approximately greater than a bus voltage of said associated distributive communication device.

4. The system of claim 1, wherein said controller comprises a microprocessor.

5. The system of claim 1, further including a shared ground line from said auxiliary power supply to each of said distributive communication devices, wherein said ground line includes a blocking diode at each of said distributive communication devices for preventing ground loop current flow.

6. A method for distributing backup power from an auxiliary DC power source to a plurality of distributive communication devices operable with DC power, comprising the steps of:

monitoring DC bus voltages on each of the distributive communication devices for detection of a power failure; and if a power failure is detected in one or more of the distributive communication devices, performing the steps of:

identifying the distributive communication devices that have experienced a power failure, and determining a sequence for acquiring the distributive communication devices from the lowest DC bus voltage to the highest DC bus voltage; and connecting the distributive communication devices to the auxiliary DC power supply in the sequence determined, wherein for each distributive communication devices connected, the DC voltage of the auxiliary is substantially matched to the DC bus voltage of that distributive communication device.

7. The method of claim 6, further including the step of dropping the acquired distributive communication devices if during said step of connecting distributive communication devices to the auxiliary power supply a new distributive communication device experiences a power failure.

* * * * *